July 3, 1951 — W. C. ANDERSON — 2,559,103
SPRING CONSTRUCTION
Filed Sept. 7, 1945 — 3 Sheets-Sheet 2
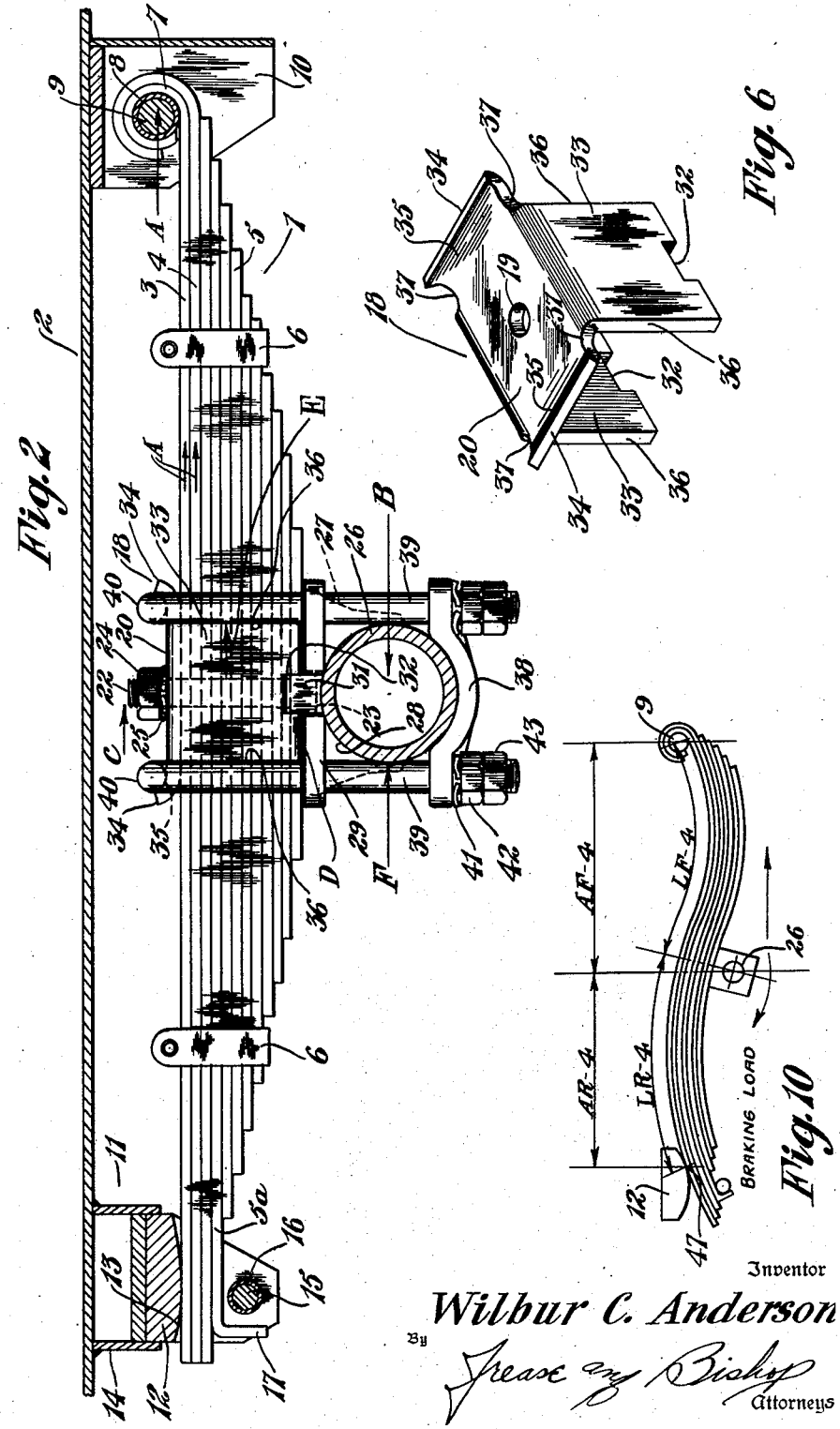
Inventor
Wilbur C. Anderson
By Frease and Bishop
Attorneys July 3, 1951 W. C. ANDERSON 2,559,103
SPRING CONSTRUCTION
Filed Sept. 7, 1945 3 Sheets-Sheet 3
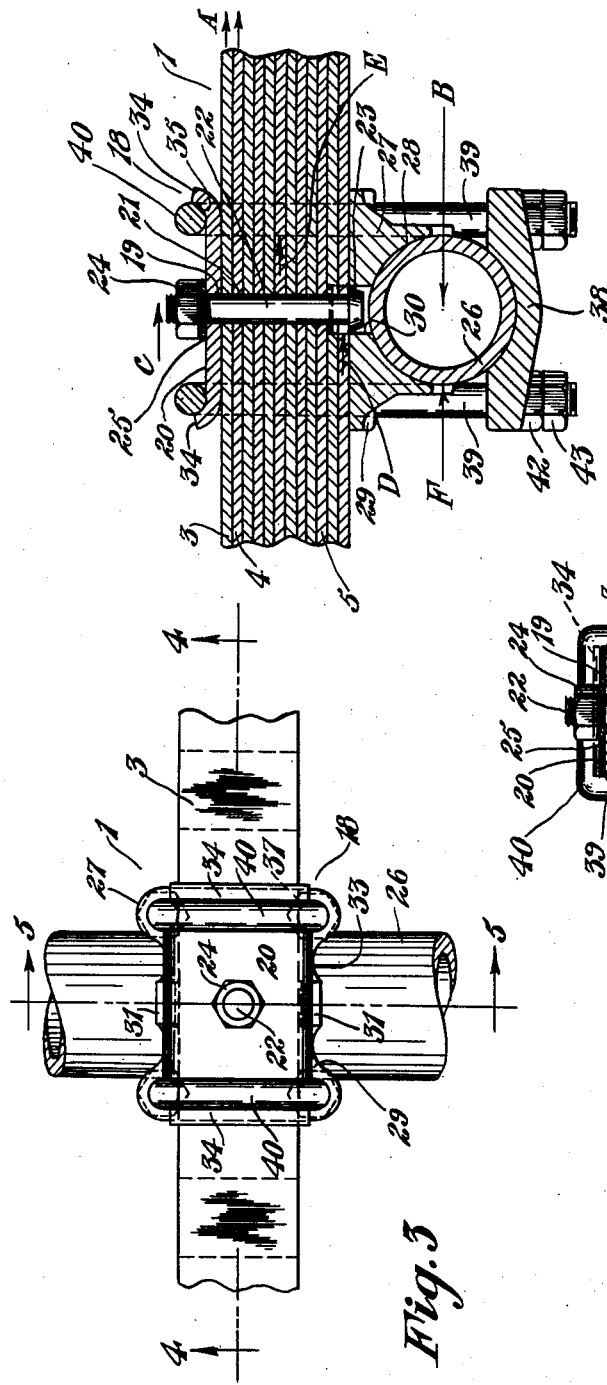
Inventor
Wilbur C. Anderson
By Frease and Bishop
Attorneys Patented July 3, 1951

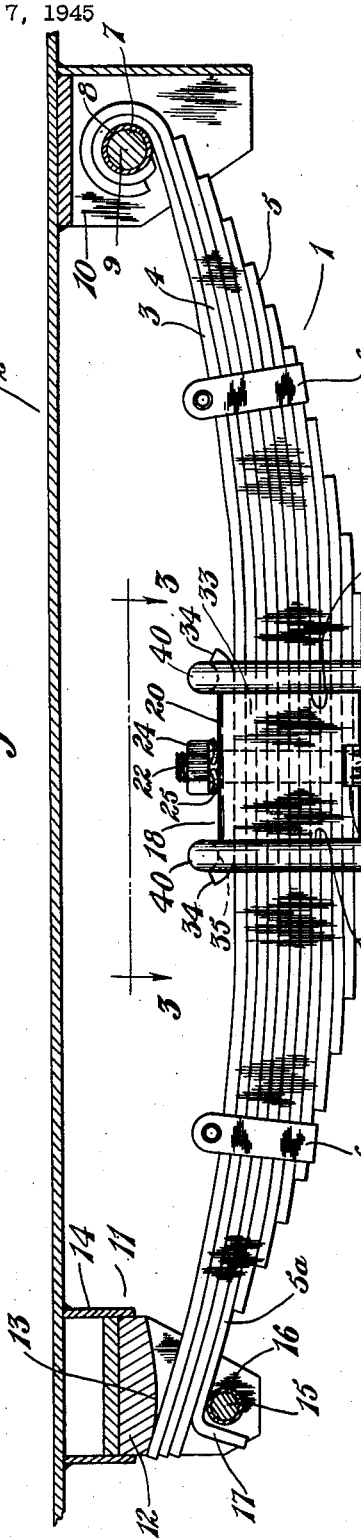

2,559,103

UNITED STATES PATENT OFFICE 2,559,103

SPRING CONSTRUCTION

Wilbur C. Anderson, Canton, Ohio, assignor to The Union Metal Manufacturing Company, Canton, Ohio, a corporation of Ohio Application September 7, 1945, Serial No. 614,836

4 Claims. (Cl. 267—44)

The invention relates to springs for vehicles, such as automobiles, trucks, tractors, trailers and the like; and more particularly to a spring construction for the "Hotchkiss" type drive.

The "Hotchkiss" type drive has been known in the art for years and was used to a considerable extent some years ago in automobile and truck construction. This type of drive is desirable because it eliminates torque arms or radius rods and eliminates the necessity of providing for their support.

In the "Hotchkiss" type drive, one end of a leaf spring is pivoted to the vehicle, and forward or backward movement of the vehicle, or tractive or braking effort or thrust is transmitted between the vehicle and axle through the spring. The other end of the spring has usually been connected by a shackle bolt to the vehicle chassis. However, use of the "Hotchkiss" type drive has practically ceased because of inherent difficulties heretofore involved in spring constructions embodied in the "Hotchkiss" type drive. These prior spring constructions have been subject to repeated failures of the spring leaves, or the connection between the spring and axle, or the center bolt for the spring leaves.

In order to maintain axle alignment, and for other reasons, in the "Hotchkiss" type drive, it is necessary to centrally secure the spring leaves together so as to attempt to prevent relative movement between the spring leaves; the occurrence of which ultimately causes failure of the spring.

Heretofore, spring leaves for a "Hotchkiss" type drive have been bolted together by a center bolt. Relative movement or slippage between the spring leaves causes the leaves to work back and forth against the bolt, subjecting the bolt to shock tension and ultimate failure. If the bolt is made larger in diameter, the larger holes through the spring leaves weaken the same. Thus, such springs have ultimately failed either by bolt failure or breakage of the leaves.

It has been attempted to overcome this difficulty by cupping the spring leaves about the center bolt holes so that the cup boss on one face of one spring leaf fits into the cup recess in the other face of an adjacent spring leaf. In such prior constructions the center bolt and the U-bolts ultimately become loosened by stretching, the occurrence of which increases the forces tending to produce spring slippage and stretching; all of which ultimately has resulted in spring failure, and the cups are a cause of initiating fatigue failure of the spring leaves.

Furthermore, repairs to springs are frequently made at a small blacksmith shop and many blacksmith shops are unable to make a cup formation in a leaf spring repair part. This situation is a further cause of failure in repaired springs.

Likewise, all spring constructions for the "Hotchkiss" type drive have also depended for proper operation upon the U-bolts which clamp the spring to the axle being pulled absolutely tight.

The relative slippage between spring and axle or between spring leaves not only produces shearing forces acting on the spring center bolt but also produces a vertical component tending to separate the spring from the axle clamp engaged by the U-bolts.

Furthermore, prior type springs for the "Hotchkiss" type drive have had another inherent difficulty in that the vehicle mounting for one end of the spring usually has caused a lengthening of the effective length of the rear half of the spring when the spring is subjected to an impact or braking loads. This condition contributed to the recurrent failure of prior spring constructions for the "Hotchkiss" type drive.

Accordingly, it is a primary object to provide a new spring construction for a "Hotchkiss" type drive which eliminates all of the prior art difficulties heretofore encountered in springs for the "Hotchkiss" type drive.

Also, it is an object of the present invention to provide a spring construction embodying U-bolts, and a center bolt which permanently and securely clamp the spring leaves against relative movement without weakening the spring leaves.

Also, it is an object of the present invention to provide a spring construction embodying a center bolt of such size and arranged and mounted so as to resist failure by shear, and in which the center bolt is only subjected to shearing forces.

Also, it is an object of the present invention to provide a spring construction including a center bolt, in which forces tending to produce slippage between spring leaves only result in forces tending to shear the center bolt, and do not produce vertical components tending to stretch the center bolt or to separate the spring leaves.

Furthermore, it is an object of the present invention to provide a new vehicle spring construction in which the shearing forces are transmitted from the upper spring leaves directly to a saddle and thence through the U-bolts and spring chair to the axle.

Furthermore, it is an object of the present invention to provide a new spring construction embodying means for maintaining the U-bolt and center bolt in tension at all times so as to prevent slippage between adjacent spring leaves.

Furthermore, it is an object of the present invention to provide a new spring construction for a "Hotchkiss" type drive in which the lever arm and effective length of the rear half of the spring is shortened when the spring is subjected to impact or braking loads, thus reducing the moment and increasing the spring strength as compared with a shackle mounted spring.

Moreover, it is an object of the present invention to provide a new spring construction which enables good and uniform riding qualities to be imparted to the vehicle equipped therewith; that is, a spring construction which provides for uniform deflection, regardless of the load, for a given bump.

Also, it is an object of the present invention to provide a new spring construction which has a greater deflection under minimum load conditions than under full or overload conditions; that is, a spring construction which becomes relatively stronger when loaded.

These and other objects and advantages apparent to those skilled in the art from the following description and claims may be obtained, the stated results achieved, and the described difficulties overcome, by the devices, elements, arrangements, parts, constructions, combinations, springs, and mountings which comprise the present invention, the nature of which is set forth in the following general statement, a preferred embodiment of which—illustrative of the best mode in which applicant has contemplated applying the principles—is set forth in the following description, and which are particularly and distinctly pointed out and set forth in the appended claims forming part hereof.

The nature of the improvements in spring construction for a "Hotchkiss" type drive may be stated in general terms as including a vehicle spring having a plurality of superimposed leaves, means pivoting the main leaves of the spring to the vehicle at one end of the spring, a generally U-shaped saddle including a base and U-legs mounted on and straddling the spring leaves substantially centrally thereof, center bolt means clamping the spring leaves and saddle together, means for tensioning the center bolt means at all times, an upper axle spring seat or chair, a lower axle clamp, there being upwardly projecting bosses formed at each side of the spring on the spring seat, means at the ends of the saddle legs interengaging said bosses, U-bolts engaging the saddle base and clamping the saddle, spring seat and axle clamp together, means for tensioning said U-bolts, means urging the legs of the U-bolts to engage the side edges of the saddle legs for maintaining the U-bolts perpendicular to the spring leaves and saddle, and a convexly egg-shaped rounded seat in section on the vehicle engaging the main leaves of the other end of the spring.

By way of example, a preferred embodiment of the improved spring construction is illustrated in the acompanying drawings forming part hereof, wherein:

Figure 1 is a side elevation of the improved spring construction with parts of a vehicle axle, frame and spring end mounts shown in section, and with the spring parts in the position which they assume under no load;

Fig. 2 is a view similar to Fig. 1 but showing the spring parts in the position that they assume under full static load;

Fig. 3 is a top plan view of a central portion of the spring looking in the direction of the arrows 3—3, Fig. 1;

Fig. 4 is a section taken on the line 4—4, Fig. 3;

Fig. 5 is a section taken on the line 5—5, Fig. 3;

Fig. 6 is a perspective view of the saddle used in the improved spring construction;

Fig. 7 is a diagrammatic view of the improved spring construction illustrating a condition of no load;

Fig. 8 is a diagrammatic view of the improved spring construction illustrating a condition of full static load;

Fig. 9 is a diagrammatic view of the improved spring construction illustrating a condition of impact load; and Fig. 10 is a diagrammatic view of the improved spring construction illustrating a condition of braking load.

Similar numerals refer to similar parts throughout the various figures of the drawings.

For the purpose of illustration, a spring construction in accordance with the present invention has been shown mounted on the underside of a trailer bed or undercarriage, but it is to be understood that the spring construction may be used for any vehicle, such as an automobile, truck, tractor, trailer or the like. Likewise, although the spring construction illustrates an overhung spring secured to the top of an axle, the connection with the axle may be underhung so that the spring is secured to the bottom of an axle.

The improved spring construction is indicated generally at 1 mounted on the underside of a trailer bed indicated generally at 2. The spring includes main leaves 3 and 4 and a plurality of auxiliary leaves 5 of varying length. Rebound clips 6 may be applied in accordance with the usual practice, and the front ends of the main leaves 3 and 4 of the spring are pivoted at 7 on a bushing 8 mounted on a pivot bolt 9 which in turn is mounted in the usual manner on a bracket 10 supported from the vehicle bed or chassis 2.

A rear spring seat generally indicated at 11 is mounted on the vehicle chassis 2 and includes a seat member 12 having a somewhat egg-shaped or elliptical convex undersurface 13 in section engaged by the top main leaf 3 of the spring 1. The bracket 14 on which the rear seat 12 is mounted may also include a cross bolt 15 provided with a bushing 16 located beneath the rear ends of some of the spring leaves; and one of the auxiliary spring leaves 5a may be provided with a downturned tongue 17 extending rearwardly behind bolt 15 so as to prevent rebound disengagement of the rear end of the spring 1 from the rear seat 12.

A saddle 18, best illustrated in Fig. 6, is mounted on and straddles the spring leaves substantially centrally thereof. The saddle is provided with a central opening 19 in its base portion 20 aligned with similar openings 21 in each spring leaf. A center bolt 22, preferably having a tapered head 23, extends through the openings 19 and 21 and rigidly, permanently and tightly clamps the spring leaves and saddle base 20 together. A nut 24 tightened against a spring washer 25 places the center bolt 22 in tension at all times to maintain the spring leaves and saddle base tightly clamped. The action of the spring washer 25 will be hereinafter described more in detail.

A vehicle axle upon which spring 1 is mounted is indicated at 26 and an upper spring seat or chair 27 is welded at 28 to the upper surface of the axle 26. The spring seat 27 includes a top plate 29 upon which the lower spring leaf rests;

and the top plate 29 is preferably provided with a central opening 30 in which the tapered head 23 of the spring center bolt 22 is engaged and centered (Figs. 4 and 5).

Upstanding lugs 31 are formed on the top plate 29 of the spring seat 27 at each side of the spring; and the lugs 31 engage in notches or recesses 32 formed in the lower ends of the legs 33 of the saddle 18.

The saddle base 20 has ends 34 curved upwardly at 35 which extend longitudinally of the spring leaves beyond the side edges 36 of the saddle legs 33; and the corners 37 between the upturned saddle base ends 34 and the side edges 36 of the saddle legs 33 are preferably rounded as best illustrated in Fig. 6 for a purpose to be later described.

The axle mount also includes a lower axle clamp 38 welded to the axle 26. The four corners of the axle clamp 38 and of the top plate 29 of the spring seat 27 are provided with holes receiving the legs 39 of U-bolts 40. The bases of the U-bolts 40 engage over the upturned ends 34 of the saddle base 20 and in the curved notches 37; and the U-bolt legs 39 extend downward along the side edges 36 of the saddle legs 33.

Spring washers 41, clamping nuts 42 and lock nuts 43 on the lower ends of the legs 39 of the U-bolts 40 rigidly and tightly clamp the spring 1, the saddle 18, the spring seat 27, and the axle clamp 38 together, and to the axle 26.

The spring washer 25 on the center bolt 22 and the spring washers 41 on the U-bolts 40 are not lock washers but are tensioning devices. The spring washers 25 and 41 have upper and lower corrugated surfaces so that they have a wavy annular contour. Such washers have unusual strength during continued tightening. A spring washer is stronger against complete flattening than the bolt with which it is associated. That is, if a nut on a bolt is tightened against a properly designed spring washer, the nut or bolt will fail before the spring washer is completely flattened. Thus the spring washers 25 and 41 always maintain the center bolt 22 and U-bolts 40 under tension. If these bolts are subjected to additional tensional stresses, the spring washers will give slightly so that the bolt does not fail, and the spring 20 then returns to its normal wavy contour when the additional load stops acting, thus maintaining the bolts in tension at all times without resulting in a permanent stretch to the bolt.

Accordingly, the parts clamped by the bolts are rigidly clamped at all times, even during the occurrence of some shock load, and even though there may be a slight yielding of the spring washer to cushion the shock load, because the bolts are tensioned at all times by the spring washers.

The center bolt 22 is preferably a hardened steel bolt of such diameter as to resist a failure by shear and fits tightly or closely, without being a press fit, within the holes 21 in the spring leaves and within the hole 19 in the saddle. Likewise, a snug fit is provided between the saddle notches 32 and the bosses 31 in the spring chair 27.

Furthermore, when the U-bolts 40 are tightened, the base of the U rides or cams on the upwardly curved ends 34 of the saddle base to tightly hold the U-bolt legs 39 against the side edges 36 of the saddle legs 33 so that the U-bolts 40 are maintained perpendicular to the spring leaves and saddle base.

Referring to Figs. 2 and 4, the force of towing the spring 1 at its front end from the trailer chassis is indicated by an arrow A directed toward the center of pivot bolt 9. This force A is transmitted to the main spring leaves 3 and 4 as indicated by the arrows A applied thereto. The force A is opposed by the weight carried by the axle 26 or by a braking force applied thereto indicated by the arrow B directed toward the center of the axle. The force A is carried from main spring leaves 3 and 4 positively to the saddle 18 because of the close fitting center bolt 22 which clamps the spring leaves and saddle together, the center bolt 22 having its tapered head seated in spring chair 27.

The force A is also carried positively to the saddle 18 by the frictional engagement between spring leaves and saddle established by the positive rigid clamping of the same by the center bolt 22. This thrust against the center bolt is indicated by the arrow C.

The saddle 18 in turn thrusts against the bosses 31 on the spring chair 27 by the snug fit interengagement between the bosses 31 and the notches 32 in the legs 33 of the saddle as indicated by the arrow D. This engagement is maintained tight by the tensioned U-bolts 40, and, because the legs 39 of the U-bolts 40 are urged into engagement with the side edges 36 of the saddle legs 33 which maintains the U-bolts perpendicular to the spring leaves and saddle, some of the thrust C of the saddle is transmitted to the U-bolts as indicated by the arrow E. The thrust is then transmitted through the spring chair 27 to the axle 26 upon which the spring chair 27 is welded, as indicated by the arrow F.

Moreover, the spring leaves are flat and free of cup projections on both surfaces around the center bolt holes and at the zones where they are clamped, thereby eliminating the occurrence of vertically acting forces.

Thus, the only forces acting are horizontal forces, none of which can result in any vertical component tending to spread the spring leaves or the upper spring leaf and saddle apart, and relative slippage between spring leaves is avoided. Any tendency of the center bolt 22 to turn out of perpendicular with respect to the plane of the spring leaves is resisted by the clamping pressure of the bolt against the saddle and spring leaves and by the clamping pressure of the U-bolts which are likewise maintained perpendicular.

Accordingly, these horizontally acting forces only produce a horizontal force C tending to shear the center bolt. However, the center bolt may be made strong enough to resist shearing by using a hardened bolt of small diameter without materially weakening the spring leaves by the small diameter holes therethrough receiving the center bolt.

The occurrence of any force tending to produce slippage between the spring leaves only produces forces tending to shear the center bolt and does not produce any forces tending to separate the spring leaves or to push them apart. It has been the occurrence of these vertical components tending to push spring leaves apart, as by cup formations on the leaves, which has in part accounted for the failure in many cases of prior art spring constructions used in the "Hotchkiss" type drive.

The present invention, in eliminating the occurrence of vertical force resultants from horizontally acting, towing or braking forces to which a spring is subjected in use, therefore eliminates one of the major causes of loosening and ultimate failure of springs and their connection with axles in the "Hotchkiss" type drive.

Another outstanding feature and new result of the improved spring construction is illustrated by reference to Figs. 7, 8, 9 and 10. Fig. 7 diagrammatically indicates the spring as shown in Fig. 1 in a position under no load. Fig. 8 illustrated diagrammatically the spring position as shown in Fig. 2 under a condition of full static load, which is the starting position from which the spring strength is designed and computed.

The spring in the position of Fig. 7, relative to the position of Fig. 8, is softer; that is, more deflection will occur per unit of increase of load, which is the normal desired characteristic of the spring. The front half of the spring from axle 26 to front pivot 9 has a lever arm AF—1 shorter than the lever arm AF—2 of the spring in the position of Fig. 8. The spring length LF—1, however, is equal to the spring length LF—2.

The shorter length lever arm AF—1 of Fig. 7 is a slight disadvantage but this disadvantage is far outweighed by the conditions affecting the rear half of the spring. Referring to the rear half of the spring of Figs. 7 and 8, the lever arm AR—1 is much longer under the no load conditions of Fig. 7 than the lever arm length AR—2 of Fig. 8. Likewise, the spring length LR—1 of Fig. 7, is longer than the spring length LR—2 of Fig. 8. The measurements are taken from the center of the axle 26 to the point of contact 44 and 45 of the upper spring leaf 3 with the rear seat 12; the lever arm measurements always being taken on horizontal line and the spring length measurements being taken along a line following the contour of the spring.

Referring to Fig. 8, the axle 26 has moved rearward with respect to Fig. 7 increasing the lever arm of the front half of the spring but holding the length of the spring constant. However, the rear contact 45 has moved forward from 44 for the back half of the spring; so that both the lever arm AR—2 and the spring length LR—2 are shortened. The changing of the lever arm length results in a smaller moment, and the changing of the spring length gives greater spring strength.

Now referring to Fig. 9 with respect to Fig 8, the axle 26 has moved forward as a result of an impact load as when the vehicle rides over a bump, thus shortening lever arm AF—3 while the spring length LF—3 remains the same for the front half of the spring. However, the point of contact of the spring with the rear seat 12 has moved further forward as indicated at 46 along the curved surface 13 of the seat 12. Thus, both the lever arm AR—3 and the length LR—3 of the rear half of the spring are further shortened, even taking into account the forward shift of axle 26. Therefore, the moment on the rear half of the spring is further reduced and the spring is further strengthened when the spring is subjected to an impact load.

Without the shift of the contact point on the rear seat from the point 45 to the point 46, the rear lever arm and spring length AR—3 and LR—3 would have been lengthened by the amount of forward movement of the axle 26. Furthermore, an additional leaf of the spring, beneath the leaf 5a comes into direct support under the rear seat 12. These conditions increase the ability of the spring to withstand impact loads.

Referring to Fig. 10, the spring position is diagrammatically illustrated as a result of a braking torque indicated by the arrow applied to axle 26. Upon the application of a braking load, the static stress in the front half of the spring is released which adds to the static stress in the rear half of the spring. However, the rear half of the spring has, similar to Fig. 9, less strain because of the shortening of the moment arm AR—4 and the shorter spring length LR—4 with respect to Fig. 7 or 8.

Thus, the improved construction withstands the shock of severe loads which occur when stopping a vehicle when loaded or when going over bumps when a considerable amount or all of the load is transferred momentarily to the rear half of the spring. In each instance, however, both the moment arm and length of the rear half of the spring is reduced. Since a leaf spring picks up strength in the ratio inversely as the order of the cube of its length, the improved spring construction is capable of withstanding extreme shock, impact or braking loads.

On the contrary, in all heretofore known spring constructions for the "Hotchkiss" type drive, a shackle mounting has been provided for the rear end of the spring so that the spring length was extended rather than shortened, thus weakening rather than strengthening the spring.

Accordingly, the present invention provides an improved spring construction for the "Hotchkiss" type drive which overcomes inherent difficulties in prior types of springs which have prevented the satisfactory use of the "Hotchkiss" type drive and enables the benefits thereof to be obtained; provides an axle mounting for a spring which properly and securely clamps the spring leaves against relative movement and consequent failure without weakening the spring leaves; provides a construction in which forces tending to produce slippage between spring leaves result only in forces tending to shear the center bolt and not in vertical components tending to separate the spring leaves; provides a construction in which the spring leaves are maintained tightly clamped by a center bolt and U-bolts always maintained in tension so as to directly transfer the towing force to the axle through the spring from the vehicle chassis without slippage; provides a construction in which the lever arm and effective spring length of the rear half of the spring is shortened when the spring is subjected to impact or braking loads thus increasing the spring strength for sustaining such loads; and provides a spring construction which may be readily manufactured and overcomes prior art difficulties and solves problems heretofore existing in the art.

The embodiment of the present improvements is illustrated and described herein by way of example, and the scope of the present invention is not limited to the exact details of construction of the various parts.

Having now described the features of the invention, the construction, operation and use of a preferred embodiment thereof, and the advantageous, new and useful results obtained by the improved spring construction; the new and useful devices, elements, arrangements, parts, constructions, combinations, sub-combinations, springs and mountings, and reasonable mechanical equivalents thereof, obvious to those skilled in the art, are set forth in the appended claims.

I claim:

1. In vehicle spring construction in which a leaf spring is pivotally mounted at least at one end to a vehicle chassis, a leaf spring including a plurality of superimposed spring leaves, a saddle including a base and legs extending from the base straddling the spring leaves, there being recesses formed in the ends of said legs, the saddle legs having side edges perpendicular to the saddle base, the saddle base having curved ends projecting beyond the side edges of the saddle legs, an axle, a spring seat secured to the axle between the spring leaves and axle, bosses projecting from said seat interengaging with the saddle leg recesses, the spring leaves and saddle base being formed with aligned similar apertures, a center bolt extending through and tightly fitting within said aligned apertures tightly clamping the spring leaves and saddle together against relative movement, U-bolts engaged over said curved saddle base ends and engaged against said saddle leg side edges clamping the spring leaves, saddle, spring seat and axle together, and spring washer means maintaining said center bolt and U-bolts tensioned at all times.

2. In vehicle spring construction in which a leaf spring is pivotally mounted at least at one end to a vehicle chassis, a leaf spring including a plurality of superimposed spring leaves, a saddle having side legs straddling the spring leaves, an axle, a spring seat secured to the axle between the spring leaves and axle, center bolt means rigidly clamping the spring leaves and saddle together and transmitting thrust from the main spring leaves directly to the saddle, interengaging means on the saddle and seat transmitting thrust from the saddle directly to the spring seat, bolt means clamping the spring leaves, saddle, spring seat and axle together, and interengaging means on the bolt means and saddle legs transmitting thrust from the saddle to said clamping means and to the spring seat and axle clamped thereby.

3. In vehicle spring construction in which a leaf spring is pivotally mounted at least at one end to a vehicle chassis, a leaf spring including a plurality of superimposed spring leaves, a U-shaped saddle having legs straddling the spring leaves, an axle, a spring seat secured to the axle between the spring leaves and axle, a lower axle clamp member secured to the axle, center bolt means rigidly clamping the spring leaves and saddle together against relative movement, the saddle legs being provided with side edges formed perpendicular to the planes of the spring leaves, U-bolts having legs straddling the saddle and spring leaves and clamping the spring leaves, saddle, spring seat, clamp member and axle together, and means urging the U-bolt legs into engagement with the edges of the saddle legs.

4. In vehicle spring construction in which a leaf spring is pivotally mounted at least at one end to a vehicle chassis, a leaf spring including a plurality of superimposed spring leaves, a saddle including a base and legs extending from the base straddling the spring leaves, the saddle legs having side edges perpendicular to the saddle base, the saddle base having curved ends projecting beyond the side edges of the saddle legs, an axle, a spring seat secured to the axle between the spring leaves and axle, a lower axle clamp member secured to the axle, center bolt means rigidly clamping the spring leaves and saddle together against relative movement, and U-bolts engaged over and urged by said curved saddle base ends into engagement against said saddle leg side edges and clamping the spring leaves, saddle, spring seat, clamp member and axle together.

WILBUR C. ANDERSON.

REFERENCES CITED

The following references are of record in the file of this patent:

UNITED STATES PATENTS

| Number | Name | Date |
| --- | --- | --- |
| 404,284 | Johnson | May 28, 1889 |
| 1,155,062 | Heisler | Sept. 28, 1915 |
| 1,238,237 | Whyte | Aug. 28, 1917 |
| 1,316,017 | Clemens | Sept. 16, 1919 |
| 1,522,511 | Gleason | Jan. 13, 1925 |
| 1,617,031 | Schacht | Feb. 8, 1927 |
| 2,065,094 | Reinochl et al. | Dec. 22, 1936 |
| 2,191,941 | Reid | Feb. 27, 1940 |
| 2,411,337 | Ridgway | Nov. 19, 1946 |
| 2,469,158 | DeFrees | May 3, 1949 |

FOREIGN PATENTS

| Number | Country | Date |
| --- | --- | --- |
| 381,073 | France | Oct. 28, 1907 |
| 203,954 | Great Britain | Sept. 20, 1923 |
| 572,385 | France | Feb. 20, 1924 |
| 665,441 | France | May 6, 1929 |
| 747,257 | France | Mar. 28, 1933 |